Patented Dec. 18, 1928.

1,695,667

UNITED STATES PATENT OFFICE.

RICHARD SCHUSTER, OF BERLIN-HALENSEE, GERMANY.

PROCESS FOR MAKING ELECTROLYTES.

No Drawing. Application filed November 13, 1923, Serial No. 674,578, and in Germany July 22, 1925.
Renewed August 8, 1928.

This invention relates to a process for making the electrolyte described in my application for Patent No. 659,380 filed August 25, 1923.

The object of the invention is to reduce the cost of making an electrolyte to its minimum while at the same time producing an electrolyte of high efficiency.

As set forth in my prior application, my electrolyte comprises bicromate of soda, sulphuric acid and water in certain proportions. I secure my bicromate of soda in that stage of its manufacture when it is in the form of a solution and before it is crystallized. If the solution is too strong, I add water to reduce it to the proper strength. I then add sulphuric acid to obtain the proportions set forth in my prior application.

Having obtained the proper proportions of bicromate, water and sulphuric acid, I then add the necessary amount of a silicate, either the silicate of potash or the silicate of soda to get the proportions set forth in my prior application.

I then put the whole mixture in an acid-proof revolving drum and heat it while the drum is being revolved. It is necessary to revolve the drum since the silicate converts the mixture into a jelly-like mass. I continue the heating of the mixture long enough to evaporate enough water to dry the electrolyte. It will be understood by those skilled in the art that this heating of this mixture would keep the contained sulphuric acid ($H_2SO_4$) in a form of water $H_2O$ plus the substance represented by the formula $S_2O_6$. After the mixture is sufficiently dry, it is removed from the drum and immediately sealed in air-tight vessels and kept until it is used as an electrolyte.

What I claim is:

1. The process of making an electrolyte which comprises adding water and sulphuric acid and a silicate to a solution of bicromate of soda, and heating the same to evaporate enough water to produce a solid mass.

2. The process of manufacturing an electrolyte which consists in mixing together a bicromate of soda taken from that stage of its manufacture when it is in the form of a solution, water, and sulphuric acid, putting the mixture in a revolving drum and continuing to revolve the same while the mixture is being heated and the water is evaporated to leave the electrolyte practically dry.

3. The process of manufacturing an electrolyte which consists in mixing together a bicromate of soda, water, sulphuric acid, putting the mixture in a revolving drum and continuing to revolve the same while the mixture is being heated and the water is evaporated to leave the electrolyte practically dry and removing from the drum the mixture and immediately sealing the same from the air in air-tight containers.

In testimony whereof I hereunto affix my signature.

RICHARD SCHUSTER.